US011963003B2

(12) United States Patent
Meyer et al.

(10) Patent No.: US 11,963,003 B2
(45) Date of Patent: Apr. 16, 2024

(54) NETWORK-CONNECTABLE SENSING DEVICE

(71) Applicant: Stefan Meyer, Romanel-sur-Lausanne (CH)

(72) Inventors: Stefan Meyer, Donneloye (CH); Ivan Olchevski, Geneva (CH); Stéphane Ballmer, Morges (CH); Vlad Trifa, Yverdon-les-Bains (CH)

(73) Assignee: Stefan Meyer, Romanel-sur-Lausanne (CH)

( * ) Notice: Subject to any disclaimer, the term of this patent is extended or adjusted under 35 U.S.C. 154(b) by 249 days.

(21) Appl. No.: 17/421,676

(22) PCT Filed: Dec. 24, 2019

(86) PCT No.: PCT/IB2019/061332
§ 371 (c)(1),
(2) Date: Jul. 8, 2021

(87) PCT Pub. No.: WO2020/144527
PCT Pub. Date: Jul. 16, 2020

(65) Prior Publication Data
US 2022/0086634 A1    Mar. 17, 2022

(30) Foreign Application Priority Data

Jan. 10, 2019   (CH) .......................................... 29/19

(51) Int. Cl.
*H04W 12/0471*     (2021.01)
*H04L 9/08*         (2006.01)
(Continued)

(52) U.S. Cl.
CPC ....... *H04W 12/0471* (2021.01); *H04L 63/123* (2013.01); *H04W 56/001* (2013.01);
(Continued)

(58) Field of Classification Search
None
See application file for complete search history.

(56) References Cited

U.S. PATENT DOCUMENTS

| 8,677,133 B1 | 3/2014 | Spencer |
| 2008/0250247 A1 | 10/2008 | Touzeau et al. |

(Continued)

FOREIGN PATENT DOCUMENTS

| EP | 1282263 A2 | 2/2003 |
| EP | 2597591 A2 | 5/2013 |

(Continued)

OTHER PUBLICATIONS

International Search Report & Written Opinion for PCT/IB2019/061332 dated Feb. 20, 2020, 9 pgs.

*Primary Examiner* — Adolf Dsouza
(74) *Attorney, Agent, or Firm* — Blank Rome LLP

(57) ABSTRACT

The invention concerns a sensing device (1) configured to selectively operate in: a manufacturing mode, an unprovisioned mode, a provisioned mode and an end-of-life mode. In the manufacturing mode, the electronic circuit (14) permanently stores a unique code (149) in a storage medium (12), while in the unprovisioned mode, the electronic circuit (14) waits for a provisioning code (31) for generating a private and a public key (143). In the provisioned mode, the electronic circuit (14) signs a timestamp (146) provided by a time-keeping unit (13) and data (110) provided by a sensing unit. The collected data (110), the timestamp (146), the digital signature (144) and the public key (143) is then transmitted. In the end-of-life mode, the electronic circuit (14) permanently erases the private key.

23 Claims, 5 Drawing Sheets

(51) Int. Cl.
*H04L 9/40* (2022.01)
*H04W 4/70* (2018.01)
*H04W 4/80* (2018.01)
*H04W 56/00* (2009.01)

(52) U.S. Cl.
CPC ............ *H04L 9/0841* (2013.01); *H04W 4/70* (2018.02); *H04W 4/80* (2018.02)

(56) References Cited

U.S. PATENT DOCUMENTS

| | | |
|---|---|---|
| 2014/0089670 A1 | 3/2014 | Maletsky et al. |
| 2014/0133656 A1 | 5/2014 | Wurster et al. |
| 2017/0084070 A1* | 3/2017 | Chamdani ............... G16H 50/30 |
| 2018/0018663 A1* | 1/2018 | Van ........................ G07F 7/0873 |
| 2018/0019663 A1 | 1/2018 | Van et al. |
| 2018/0330109 A1 | 11/2018 | Nix |
| 2019/0289454 A1 | 9/2019 | Inoue |

FOREIGN PATENT DOCUMENTS

| | | | |
|---|---|---|---|
| JP | 2018-78578 A | 5/2018 | |
| WO | WO-03077745 A1 * | 9/2003 | ........... A61B 5/0006 |
| WO | WO-2017/007725 A1 | 1/2017 | |
| WO | 2017172171 A1 | 10/2017 | |
| WO | 2017205770 A1 | 11/2017 | |
| WO | WO-2018/066362 A1 | 8/2019 | |

* cited by examiner

NETWORK-CONNECTABLE SENSING DEVICE

RELATED APPLICATIONS

The present application is a national phase of PCT/IB2019/061332, filed Dec. 24, 2019, which claims the benefit of Swiss Patent Application No. 00029/19, filed Jan. 10, 2019. The entire disclosures of which are hereby incorporated by reference.

FIELD OF THE INVENTION

The present invention concerns a network-connectable sensing device, notably a network-connectable multi-sensing device.

DESCRIPTION OF RELATED ART

Network-connectable sensing devices, such as internet-of-things (IoT) devices, are electronic remotely providing measures of physical entities (data) to a receiving device (e.g. server), directly or via gateways. Most of them rely on Bluetooth Low Energy (BLE) communications for transmitting these data.

As data are transmitted on uncontrollable medium, data are vulnerable to spoofing or malicious attacks that can lead to an uncomfortable or critical situation.

Even if some of network-connectable sensing devices are configured to encrypt data, network-connectable sensing devices remain still vulnerable to spoofing or malicious attacks, in particular against attacks based on identity replacement, keys replacement and/or a retransmission of an older intercepted data.

BRIEF SUMMARY OF THE INVENTION

An aim of the invention is to provide a sensing device capable of measuring physical entities and transmit the result remotely in a way that resists against spoofing and malicious attacks better than known systems and methods.

According to the invention, these aims are achieved by means of the network-connectable sensing device of claim 1 and the method for transmitting data from a sensing device to a server of claim 22.

This solution provides a more robust transmission of measures of physical entities provided by the sensing device, as:
  the permanent unique code prevents unauthorized or malevolent generation or regeneration of private and public keys;
  the packed data provide a public key permitting a verification of the integrity of collected data (e.g. measurements); and
  each signed packed data is made unique by the timestamp.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
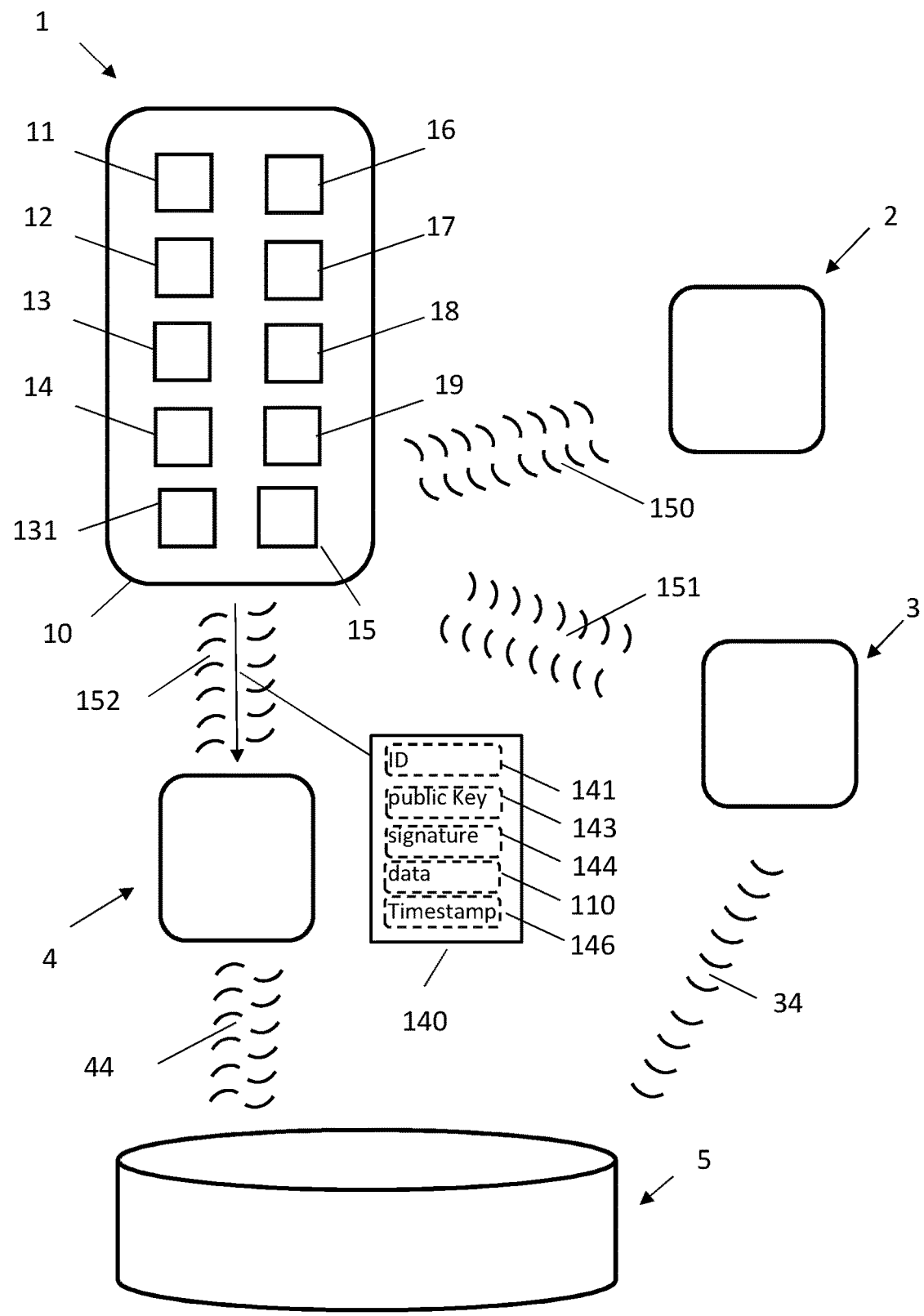
FIG. 1 shows a schematically view of a communication system comprising a network-connectable sensing device, according to the invention.

FIG. 1 shows a schematically view of a communication system comprising a network-connectable sensing device 1 configured to remotely provide a measure of a given physical quantity or phenomenon, notably in form of digital data, to a remotely located server 5.

The server 5 can be any electronic device providing storage and/or analysis of provided measures, such as a computer, a laptop, a smartphone, a smartwatch, a tablet, a portable device, or any other suitable device.

The sensing device 1 of FIG. 1 comprises a sensing unit 11 for sensing one or more desired (physical) phenomenon, i.e. events or changes of or affecting the sensing device or the environment where the sensing device is located. In particular, the sensing unit 11 can be configured to sense (measure): a temperature (of the environment and/or of the sensing device), a humidity, a light, a (relative and/or absolute) position of the sensing device, an acceleration of the sensing device, or a shock affecting the sensing device, or a combination thereof.

The sensing device 1 comprises a communication unit 15 for transmitting data collected from sensing unit 11 to the server 5, directly or via a gateway device 4, notably in form of a packed data 140. The communication unit 15 is also configured for receiving digital data and/or signals from the server 5, the gateway device 4 or from another device 2,3.

The gateway device can be any device providing a transmission of data between the sensing device 1 and a server. The gateway device can be a mobile, transposable or static device.

The sensing device 1 then comprises an electronic circuit 14 providing a signature 144 of transmitted data 110 by means of a private key of a given asymmetric key so as the server 5 and/or the gateway device 4 can verify, by means of the public key 143 of the given asymmetric key, the integrity of the transmitted data. A public and permanent verification is enabled by providing the digital signature 144 and the public key 143 with the packed data 140.

The packed data 140 also comprises a timestamp 146 provided by a time-keeping unit 13 of the sensing device 1, the timestamp being also signed by the (same) private key.

The timestamp 146 is a sequence of symbols (being represented in a digital format) for identifying a phenomenon sensing, a data acquisition and/or a transmission event occurred. The symbols can be function or represent a giving date and time of day, preferably accurate to a small fraction of a second. Alternatively, the timestamp can be a unique sequence of symbol (e.g. random or pseudorandom sequence of symbols) assigned to a phenomenon sensing, a data acquisition and/or a transmission event.

The symbols of the timestamp 146 can consist in or comprise: alphanumerical symbols, one or more numerical symbols, one or more binary digits, one or more typographical symbols, and/or one or more graphical symbols, or a combination thereof.

The absolute (or at least the relative) uniqueness of the timestamp ensures a uniqueness of the generated signature (the signature of each packed data differs from the signatures of others packed data) providing an (intrinsic) detection of a spoofing or malevolent attack based on data copying or retransmission.

The time-keeping unit 13 can comprise a dedicated clock or can rely on a (shared) clock of the sensing device 1 or of a component thereof (e.g. the electronic circuit 14).

Advantageously, the dedicated or shared clock may be a controlled clock 131, i.e. a clock that is automatically (i.e. by itself, with no direct human control) synchronized by a synchronization signal (e.g. time code) transmitted by a single or multiple of transmitters connected to a time standard, such as an atomic clock and/or a coordinated universal time (UTC). The transmitter can be a national or regional time transmitter or a universal time transmitter. The multiple transmitters can be parts of a relative or absolute positioning system requiring a time synchronization, such as a global (satellite) positioning system (e.g. GPS, Galileo or GLONASS). Such systems may be used to automatically set and/or synchronize the controlled clock.

The synchronization signal can be a radio synchronization signal transmitted by a radio transmitter and acquired through the communication unit (15) and/or a radio antenna of the sensing device 1.

Alternatively, or complementarily, the synchronization signal can be provided by a relative or absolute positioning system 17 of the sensing unit 11 and/or of the sensing device 1, the system being configured to provide a clock synchronization with a time reference. Preferably, the relative or absolute positioning system 17 is a global satellite positioning system (GNSS), notably relying on a GPS, Galileo and/or GLONASS satellites constellation.

Alternatively or complementarily, the synchronization signal can be a wired synchronization signal provided by the communication unit 15 and/or by a connection interface of the communication unit 15 and/or of the sensing device 1.

The network-connectable sensing device 1 is advantageously a standalone device, i.e. an off-the-grid powered device.

The sensing device can thus comprise an energy storage module 18 for electrical powering the active components thereof. The energy storage module 18 can be an non-rechargeable or a rechargeable power pack, notably comprising or constituted in one or more accumulators and/or batteries.

The sensing device can comprise a protecting case or casing 10 for protecting the sensing device, notably the components thereof, against tampering. The protecting casing 10 encloses the components of the sensing device and, advantageously, the casing can be a watertight and/or airtight casing.

Figure 5:
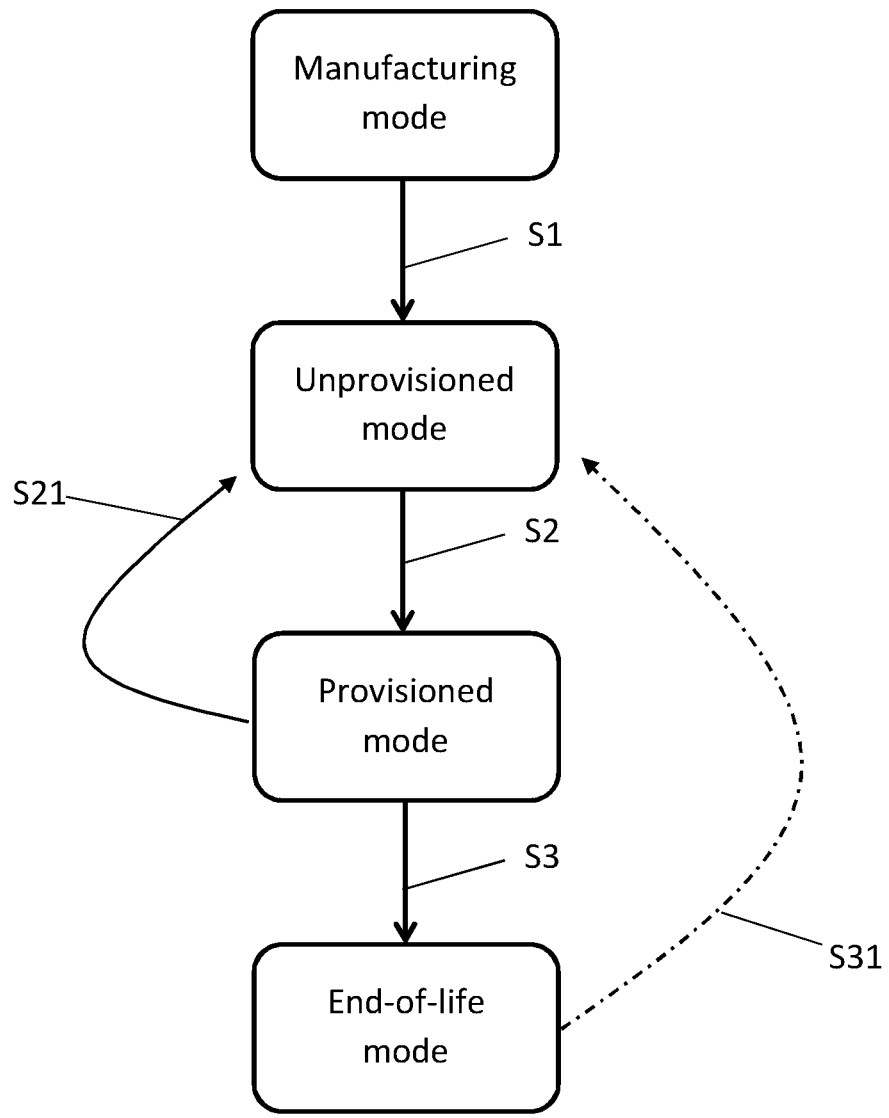
FIG. 5 shows an exemplary flow diagram of operational modes of the sensing device of FIG. 1.

The device of the invention foresees several modes of operation and is configured to operate selectively in one or another of the available modes In order to increase the robustness against attacks based on identity replacement and/or keys replacement, the sensing device 1 foresees and is configured to selectively operate in at least: a manufacturing mode, an unprovisioned mode, a provisioned mode, and an end-of-life mode (cf. FIG. 5).

Figure 2:
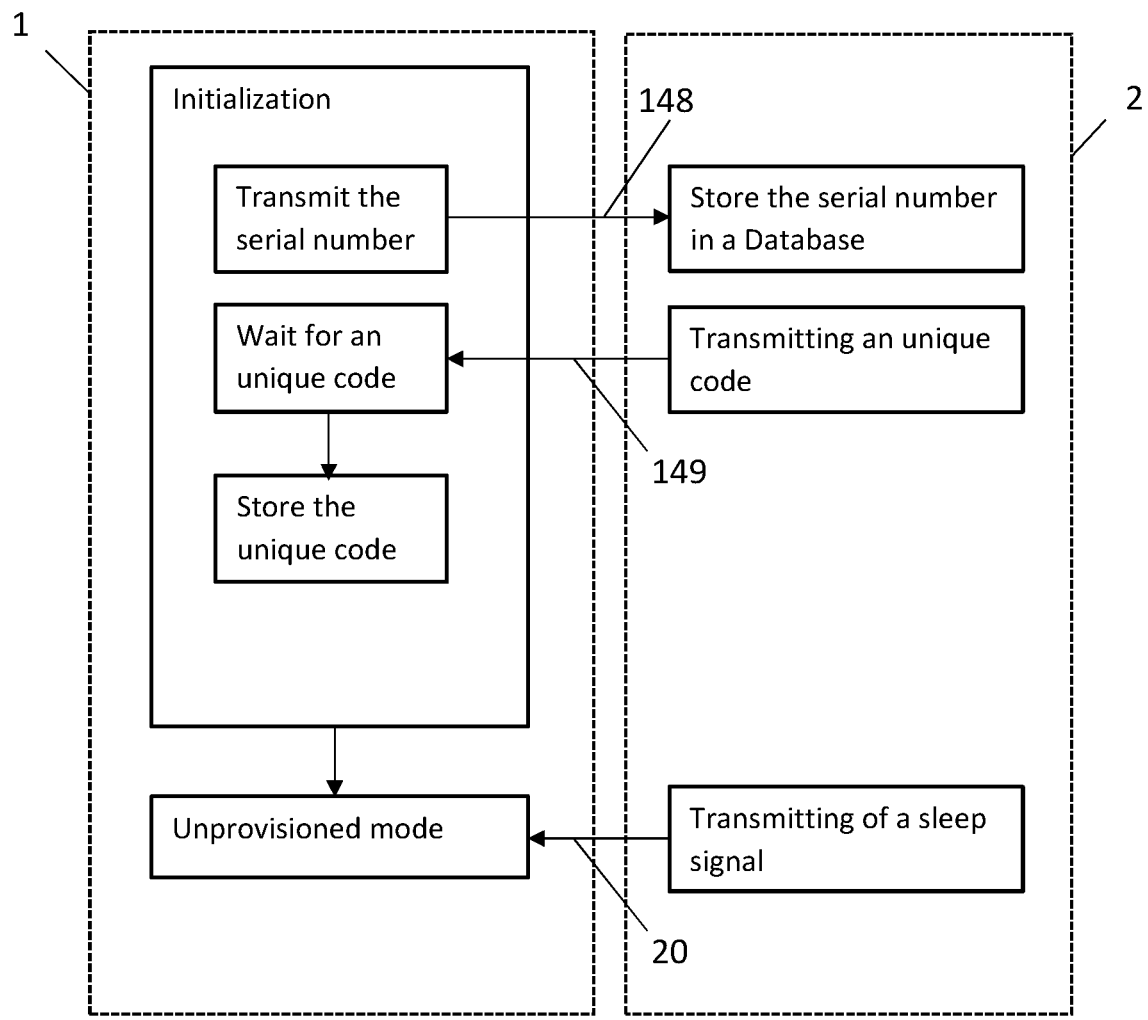
FIG. 2 shows an exemplary flow diagram of the sensing device of FIG. 1 operating in a manufacturing mode.

FIG. 2 shows an exemplary flow diagram of the sensing device 1 operating in a manufacturing mode.

In the manufacturing mode, the electronic circuit 14 is configured to permanently store a unique code 149 in a storage medium 12 of the sensing device 1, notably in a digital format.

In particular, the unique code 149 can be stored in a dedicated storage unit of the storage medium 12, the dedicated storage unit providing storage of the unique code 149 uniquely once.

The unique code 149 is a sequence of symbols guarantee to be unique among all the codes used for others sensing devices.

The storage medium 12 is any single or multiple units (e.g. having form of electronic circuits or devices) providing storing of data (in a digital format), the data being notably collected and/or operationally destined to components of the sensing device 1.

In particular, the unique code 149 can be provided from a manufacturing device 2, notably in response of providing the serial number of (e.g. unique manufacturing identifier assigned to) the sensing device 1. The serial number of the sensing device 1 can be Hard-written during the manufacturing of the sensing device 1 or stored in a read-only storage medium accessible (i.e. readable) by the electronic circuit 14.

In particular, the sensing device 1 can be configured (notably through the electronic circuit 14) to wait for a reception of the unique code 149 from a manufacturing device 2 once, notably when the sensing device is powered for the first time, e.g. by the energy storage module 18.

As illustrated in FIG. 5, the sensing device 1 can be configured to (automatically) switch from the manufacturing mode to the unprovisioned mode (S1), in response of:
the reception and/or storing of the unique code 149 in the storage medium 12; and/or
a reception of a sleep signal 20 provided by the manufacturing device 2, notably through the communication unit 15.

The communication between the sensing device 1 and the manufacturing device 2 can rely on a wired and/or wireless data link 150 provided by the communication unit 15. The data link 150 can be mono- or bi-directional (notably in case of a transmission of the serial number to the manufacturing device 2).

Figure 3:
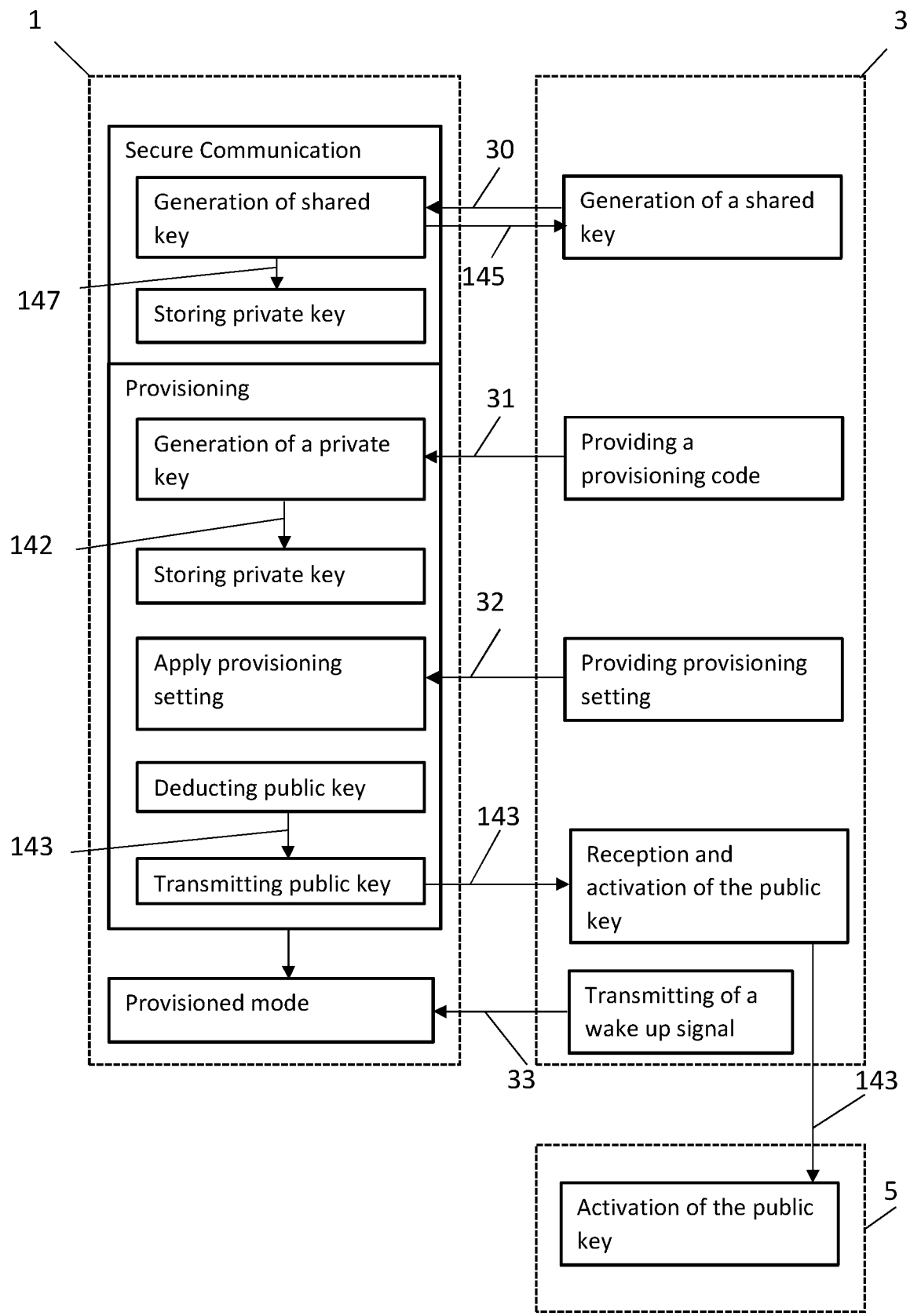
FIG. 3 shows an exemplary flow diagram of the sensing device of FIG. 1 operating in an unprovisioned mode.

FIG. 3 shows an exemplary flow diagram of the sensing device of FIG. 1 operating in an unprovisioned mode;

In the unprovisioned mode, the sensing device is configured to wait for a receiving a provisioning signal for generating the asymmetric keys pair used for signing the collected data and the timestamp of the packed data. During the wait, the sensing device is advantageously configured to operate in a sleep mode, wherein the communication unit 15 is configured to operate in reception-only mode (i.e. no transmission is allowed and/or operated).

In particular, the electronic circuit 14 is configured to wait for receiving a provisioning signal constituted of or comprising a provisioning code 31, and, in response of a provisioning code 31 matching the unique code 149 of the sensing device, to:
generate the private key 142 for signing (digital) data, and deduct (generate) a public key 143 for verifying data being signed by said private key 142.

The provisioning code 31 matching the unique code 149 provides the authentication of the providing device.

More advantageously, the electronic circuit can be configured to wait for the provisioning signal being a near-field communication (NFC) signal, e.g. by configuring the communication unit 15 to establish uniquely a near-field communication 151 with the provisioning device 3, e.g. by bringing the sensing device and the provisioning device within 4 cm, preferably according to the NFC communication protocol.

The near-field communication 151 can be enabled by (uniquely) activating a NFC reader of the communication unit 15.

As long as the sensing device is in the sleep mode while waiting for the (NFC) provisioning signal to wake it up, any attempt to remotely attack the sensing device is impeded. This permits a safer long shelf life time.

Advantageously, in the sleep mode the sensing unit and/or the time-keeping unit 13 are disabled so as to reduce power consumption. This permits to further provide a longer shelf life time.

In the unprovisioned mode, the communication unit 15 can be configured to establish an unsecured or, advantageously a secured communication with said provisioning device 3 based on a shared key 147.

The shared key 147 can be retrieved from the storage medium 12.

Alternatively or complementarily, the shared key 147 can be generated by the electronic circuit 14; notably based on a secret data of the sensing device (e.g. the unique code 149) and on a pre-shared key 30 provided by the provisioning device 3. Preferably, the electronic circuit 14 can provide a related pre-shared key for permitting the provisioning device to generate the same shared key, without a (direct) transmission thereof. In particular, the shared key 147 can be generated relying on the Diffie-Hellman key exchange protocol.

The generated shared key 147 can then be stored in the storage medium 12 for allowing later communication with the (same) providing device.

This permits, not only a creation of a secure connection between the sensing device and the providing device but also a trusted pairing between the sensing device and the providing device, with out-of-band pre-shared key exchange.

Moreover, in response of a provisioning code 31 matching the unique code 149 of the sensing device, the electronic circuit can be configured to receive provisioning setting 32 provided by the provisioning device 3. Once received, the sensing device can be configured to apply the received provisioning setting 32, notably by storing it in the storage medium and/or by setting up components of the sensing device according to the received provisioning setting 32.

The provisioning setting 32 can comprise:
- a sensing device identifier 141 to be transmitted in the packed data; and/or
- a setting for sensing unit, such as measurements rate or frequency, measuring accuracy, sensing threshold, activation/deactivation of sensing elements of the sensing unit; and/or
- a setting for communication unit; and/or
- a setting for the clock and/or timekeeping module, such as a setting up and/or synchronization signal; and/or
- a triggering event triggering a measurement and/or a collection of data provided by the sensing unit; notably a detection threshold for measured movements and/or acceleration; and/or
- package information.

Advantageously, the electronic circuit can be configured to transmit the public key 143, once generated, to the provisioning device so as to activate the public key 143 on the server 5.

The sensing device 1 can be configured to (automatically) switch from the unprovisioned mode to the provisioned mode (S2), in response of:
- the generation of the private key 142, and/or
- the deduction of the public key 143, and/or
- the application of provisioning setting 32, and/or
- a reception of a wakeup signal 33 provided by the provisioning device 3, and/or
- the activation of the public key 143 on the server 5.

Figure 4:
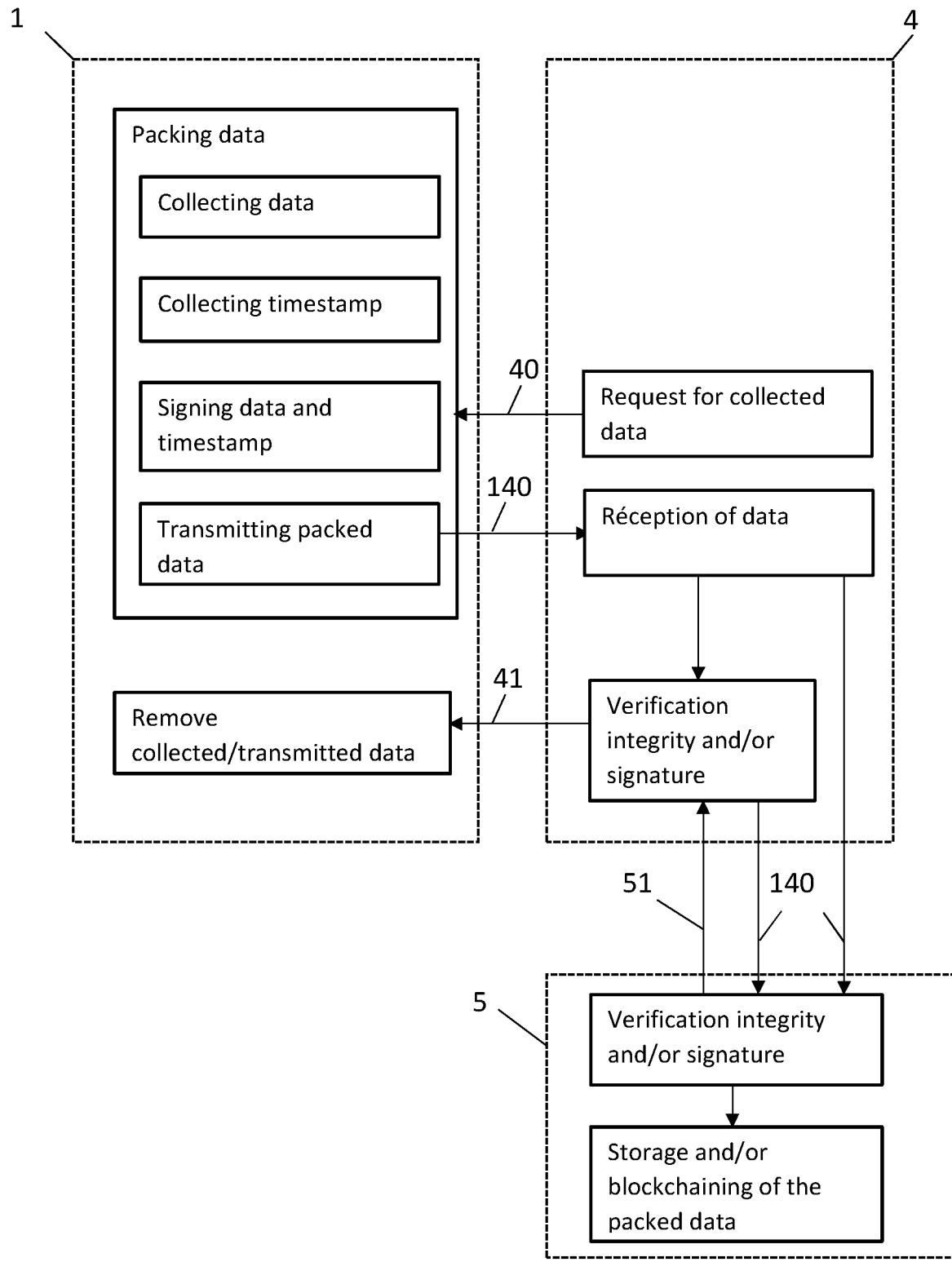
FIG. 4 shows an exemplary flow diagram of the sensing device of FIG. 1 operating in a provisioned mode.

FIG. 4 shows an exemplary flow diagram of the sensing device of FIG. 1 operating in a provisioned mode.

In the provisioned mode, the electronic circuit 14 is configured to collect data 110 provided by the sensing unit 11 and to:
- sign, by the private key 142, the collected data 110 and the timestamp 146 provided by the time-keeping unit 13 so as to provide a digital signature 144, and
- transmit a packed data 140 to the server 5, directly or by means of the gateway device 4, the packed data 140 comprising the collected data 110, the timestamp 146, the digital signature 144, the public key (143) and, eventually the sensing device identifier 141.

In particular, in the provisioned mode, the electronic circuit 14 is configured to collect data 110 provided by the sensing unit 11, notably according to:
- given collecting and/or sensing rules, and/or
- provisioning setting 32 provided by the provisioning device, notably according to:
  - provided triggering event for triggering a measurement and/or a collection of data; and/or
  - provided detection threshold.

Advantageously, the electronic circuit 14 is configured to store collected data in the in the storage medium 12 and to wait for a request signal 40 provided by the gateway device 4 and/or the server 5. In response of the request signal 40 provided by the gateway device 4 and/or the server 5, the electronic circuit 14 is configured to:
- sign the collected data 110 (e.g. data stored in the storage medium 12) and the timestamp 146, and
- transmit the packed data 140.

In particular, the electronic circuit 14 can be configured to collect and store data provided by the sensing unit 11 in response of a movement and/or an acceleration sensed by an accelerometer 19 of the sensing device 1, the sensed movement and/or the acceleration being above a detection threshold, preferably being provided by the provisioning setting 32.

The electronic circuit 14 can be configured to wait for an acknowledge signal 41 provided by the gateway device 4 and/or the server 5 and, in response of reception of the acknowledge signal 41 confirming a safe reception of the packed data and/or a verification of the signature, to remove transmitted data from the storage medium 12. Alternatively or complementarily, the acknowledge signal 41 can be provided by checking the activation of the public key on the server 5.

Data removal can comprises data erasure (i.e. overwriting selected data by using zeros and ones for completely (definitely) destroying selected data on the storage medium 12).

The packed data 140 can be transmitted to the gateway device by means of a local communication 152 established between the sensing device and the gateway device (i.e. a communication relying the sensing device and the gateway device being spaced away up to 1 km, preferably in a range from 4 cm up to 500 meters) by means of the communication unit 15. The local communication can be: a wireless area network communication, a radio wireless local area communication, a Bluetooth communication, an ANT communication, a wired communication (such as a USB communication), or a combination thereof.

Alternatively or complementarily, the packed data 140 can be transmitted by means of a point-to-point communication 152 established between the sensing device and the gateway device and/or the server 5, wherein the point-to-point communication relying on at least a point-to-point computer network connection (such as a wired and/or wireless cellular network, a satellite network, a wired network).

The gateway device 3 can, before or advantageously after verification of the signature 144, transfer the (entire) packed data 140 to the server 5 for storage, preferably using a blockchain for providing secure recording. Once stored and/or blockchained (i.e. stored or recorded using a blockchain) on the server, the packed data 140 can be placed at disposal of a user that can always verify the integrity of the data provided by the sensing device 1, notably by means of the signature 144 and the public key 143 provided in the packed data 140.

As illustrated in FIG. 5, in the end-of-life mode, the sensing device is configured (notably through the electronic circuit) to be temporarily or permanently disabled, notably by permanently erase the private key 142.

The electronic circuit 14 can be configured to permanently disable the sensing device 1, notably by triggering a (mechanical and/or electronical) disabling of one or more components of the sensing device 1.

In particular, the electronic circuit 14 can trigger:

- a break or a destruction of the battery, e.g. by shortcutting his electrical poles or by means of an actuator; and/or
- a complete discharge of the battery; and/or
- a break or an opening of the sealed casing, e.g. by means of an actuator; and/or
- a break or a destruction of the sensor unit, e.g. by triggering an overvoltage or by means of an actuator; and/or
- a break or a destruction of the storage medium, e.g. by triggering an overvoltage or by means of an actuator; and/or
- a destruction of instruction data residing on the sensing device (notably on the storage medium and/or on the electronic circuit), instruction data being notably readable by the electronic circuit 14 so as to enable one or more tasks of the electronic circuit 14; and/or
- a break or a shortcut of electrical connections of the sensing device, e.g. of electrical connections electrically relying the electronic circuit 14 to others components of the sensing device; e.g. by triggering an overvoltage or by means of an actuator.

Alternatively, in order to provide a safe re-use of the sensing device 1, in the end-of-life mode, the electronic circuit 14 can be configured to permanently erase (collected) data 110 from the storage medium and to switch the sensing device 1 into the unprovisioned mode (S31). Preferably, the electronic circuit 14 can be configured to permanently erase (e.g. by data erasure) the public key and/or the provisioning setting.

In particular, the sensing device can be configured to switch into the end-of-life mode (notably by means of the electronic circuit) in response of:

- a reception of an end-of-life signal provided by a device, notably by the conditioning device; and/or
- a detection a remaining energy of the storage module 18 being below a given energy threshold (by means of the electronic circuit), preferably the energy threshold being provided by the manufacturing device and/or the provisioning device 3, e.g. by means of the provisioning setting 32; and/or
- a detection of a tampering of the protecting casing 10 provided by a tampering detector 16 of the sensing device 1.

The sensing device 1 can also be configured to (automatically) switch from the end-of-life mode or from the provisioned mode to the unprovisioned mode (S21, S31) in response of a reception of a provisioning code 31 provided by the (coupled) provisioning device 3, wherein provisioning code 31 matches the unique code 149 of the sensing device. This permits a trusted re-initialization of the sensing device 1.

The sensing device 1 provides thus a more robust transmission of measures of physical entities provided by the sensing device, as:

- the permanent unique code prevents unauthorized or malevolent generation or regeneration of private and public keys;
- the packed data provide a public key permitting a verification of the integrity of collected data (e.g. measurements); and
- each signed packed data is made unique by the timestamp.

In fact, as the packed data is different for each transmission, a data-replication attack will be easily detected on the server by comparing already stored and/or blockchain recorded packed data. Timestamp ensures the signature generated is different, and so the package cannot be simply copied.

The public key provided by the sensing device can provide the origin of the data, avoiding identity-stolen attacks, as the (related) private key is randomly generated on the device itself when provisioned (i.e. the sensing device is the only one to know the private key and the private key is unique). Moreover, the public key is transmitted within the packed data so as to allow a user to verify that the information was really signed by the device. This signature acts as an authentication certification.

The robustness of the transmission can be further increased by activating, on the server 5, the public key 243 being generated on the sensing device 1, preferably the public key 143 being transmitted to the server 5 by means of the provisioning device 3. The activation can be used, on the server and/or on the gateway device, for validating a received packed data (notably the public key thereof) and/or for allowing a storage and/or a blokchaining of the received packed data.

NUMERICAL REFERENCES USED IN THE DRAWINGS

1 Sensing device
10 Casing
11 Sensing unit
110 Data
12 Storage medium
13 Time-keeping unit
131 Clock
14 Electronic circuit
140 Packed data
141 Identity
142 Private key
143 Public key
144 Signature
145 Key code
146 Timestamp
147 Shared key
148 Serial number
149 Unique code
15 Communication unit
150 Data link
151 Near-Field communication (NFC) data link 152 (Wireless) Data link
16 Tampering detector
17 Global positioning system
18 Energy storage module
19 Accelerometer
2 Manufacturing device
20 Sleep signal
3 Provisioning device
30 Pre-shared key
31 Provisioning code
32 Provisioning setting
33 Wake-up signal
34 Data link
4 Gateway device
40 Request signal
41 Acknowledge signal
44 Data link
5 Server
51 Acknowledge signal
S1, S21, S31 Switch to unprovisioned mode
S2 Switch to provisioned mode
S3 Switch to end-of-life mode

The invention claimed is:

1. A sensing device comprising:
a sensing unit for sensing at least a given phenomenon; a storage medium for storing digital data;
a communication unit for receiving and transmitting digital data and/or signals;
a time-keeping unit for providing a timestamp, and an electronic circuit being operationally connected to the storage medium, the sensing unit, the communication unit, and to the time-keeping unit;
wherein the sensing device is configured to selectively operate in:
a manufacturing mode, wherein the electronic circuit is configured to permanently store an unique code in the storage medium;
an unprovisioned mode wherein the electronic circuit is configured to wait for receiving a provisioning code from a provisioning device, and, in response of a provisioning code matching the unique code of the sensing device, to:
generate a private key for signing data, and
deduct a public key for verifying data being signed by said private key;
a provisioned mode, wherein the electronic circuit is configured to collect data provided by the sensing unit and to:
sign, by said private key, the collected data and a timestamp identifying an acquisition of the collected data or a transmission event provided by the time-keeping unit so as to provide a digital signature being verifiable by said public key, and
transmit a packed data to a gateway device and/or to a server, the packed data comprising the collected data, the timestamp, the digital signature and the public key; and
an end-of-life mode, wherein the electronic circuit is configured to permanently erase the private key.

2. The sensing device according to claim 1, wherein, in the manufacturing mode, the electronic circuit is configured to receive said unique code from a manufacturing device.

3. The sensing device according to claim 2, wherein, in the manufacturing mode, the electronic circuit is configured to send a serial number to said manufacturing device; preferably said numerical serial being a unique identifier assigned to the sensing device.

4. The sensing device according to claim 1, wherein the sensing device is configured to switch from the manufacturing mode to the unprovisioned mode, in response of the storing of the unique code in the storage medium and/or of a reception of a sleep signal provided by the manufacturing device.

5. The sensing device according to claim 1, wherein the electronic circuit is configured, in response of a provisioning code matching the unique code of the sensing device, to apply provisioning setting provided by the provisioning device;
the provisioning setting comprising: a sensing device identifier 141 to be transmitted in the packed data; and/or
a setting for sensing unit, such as measurements rate or frequency, measuring accuracy, sensing threshold, activation/deactivation of sensing elements of the sensing unit; and/or
a setting for communication unit; and/or
a setting for the clock and/or timekeeping module, such as a setting up and/or synchronization signal; and/or
a triggering event triggering a measurement and/or a collection of data provided by the sensing unit;
package information.

6. The sensing device according to claim 1, wherein, in the unprovisioned mode, the communication unit is configured to establish a near-field communication with said provisioning device.

7. The sensing device according to claim 1, wherein, in the unprovisioned mode, the communication unit is configured to establish an unsecured or secured communication with said provisioning device based on a shared key;
preferably the shared key being retrieved and/or generated by the electronic circuit; preferably said shared key being stored in the storage medium.

8. The sensing device according to claim 7, the electronic circuit being configured to receive a pre-shared key from the provisioning device and to generate the shared key from said pre shared key and from a secret data, notably the unique code.

9. The sensing device according to claim 1, wherein the sensing device is configured to switch from the unprovisioned mode to the provisioned mode, in response of the generation of the private key and/or of the deduction of the public key and/or the application of provisioning setting and/or of a reception of a wakeup signal provided by the provisioning device.

10. The sensing device according to claim 1, wherein, in the provisioned mode, the electronic circuit is configured store collected data in the storage medium and, in response of a request signal provided by a gateway device and/or the server, to:
sign the collected data and the timestamp; and transmit the packed data.

11. The sensing device according to claim 10, wherein, in the provisioned mode, the electronic circuit is configured to receive an acknowledge signal from the gateway device and/or the server confirming a safe reception of the packed data and to, in response of reception of an acknowledge signal, remove collected data from the storage medium.

12. The sensing device according to claim 1, wherein, in response of a reception of an end-of-life signal, the sensing device is configured to switch into the end-of-life mode.

13. The sensing device according to claim 1, wherein, in the provisioned mode, the communication unit is configured to establish a local communication with said gateway device;

preferably the local communication being: a wireless area network communication, a radio wireless local area communication, a Bluetooth communication, an ANT communication, a wired communication, a USB communication or a combination thereof.

14. The sensing device according to claim 1, wherein, in the provisioned mode, the communication unit is configured to establish a point-to-point communication with said gateway device;
preferably said point-to-point communication relying on at least a point-to-point computer network connection, such as a wired and/or wireless cellular network, a satellite network, a wired network, and/or a combination thereof.

15. The sensing device according to claim 1, wherein, in the end-of-life mode, the electronic circuit is configured to permanently erase collected data provided by the sensing unit and to switch the sensing device into the unprovisioned mode.

16. The sensing device according to claim 1, wherein, in the end-of-life mode, the electronic circuit is configured to permanently disable the sensing device.

17. The sensing device according to claim 1, the time-keeping unit being configured to provide a clock synchronization with a reference time, notably with a coordinated universal time, by acquiring a synchronization signal;
preferably said synchronization signal being a radio, satellite and/or wired synchronization signal provided by the communication unit and/or a global positioning system and/or a radio antenna;
preferably the time-keeping unit comprises or being operationally connected with a controlled clock, preferably being a radio controlled clock.

18. The sensing device according to claim 1, further comprising a protecting casing for protecting against tampering; preferably the protecting casing being a watertight and/or airtight casing;
the protecting casing enclosing the communication unit, the sensing unit, the storage medium, the electronic circuit, the time-keeping unit, the global positioning system, and/or the radio antenna, the clock.

19. The sensing device according to claim 18, further comprising a tampering detector configured to detect a tampering of the protecting casing; preferably the tampering detector being enclosed in the protecting casing; wherein
in response of a detection of a tampering, the sensing device is configured to switch into the end-of-lite mode.

20. The sensing device according to claim 1, further comprising:
an energy storage module for electrical powering the electronic circuit, the communication unit, the sensing unit, the storage medium, the electronic circuit, the time-keeping unit, the tampering detector, the global positioning system, the clock, and/or the radio antenna; preferably the energy storage module being enclosed in the protecting casing; wherein
the electronic circuit is configured to detect a remaining energy of the storage module being below a given energy threshold, and, in response of a detection of a remaining energy below said threshold, to switch the sensing device into the end-of-life mode.

21. The sensing device according to claim 1, the electronic circuit being configured to collect data provided by the sensing unit in response of a movement and/or an acceleration detected by an accelerometer, preferably in response of a movement and/or an acceleration above a detection threshold, preferably the provisioning setting comprising said detection threshold.

22. A method for transmitting data from a sensing device, the method comprising steps of:
permanently store an unique code in a storage medium of the sensing device;
generating, on the sensing device, a private key and a public key in response of providing a provisioning code matching the unique code, preferably provided by a provisioning device;
signing, on the sensing device, collected data provided by a sensing unit and a timestamp provided by a time-keeping unit by said private key so as to provide a digital signature;
transmitting to a server a packed data comprising the collected data, the timestamp, the digital signature and the public key; and then
permanently erase, on the sensing device, the private key, in response of a detection of a tampering of the protecting casing of the sensing device and/or of a detection of a remaining energy of a storage module of the sensing device being below a given energy threshold and/or of a reception of an end-of-live signal.

23. The method according to claim 22, further comprising activation, on the server, of the public key generated on the sensing device;
preferably said activation comprising transmitting the public key to the server through the provisioning device.

* * * * *